(12) United States Patent
Floarea et al.

(10) Patent No.: US 12,365,211 B2
(45) Date of Patent: Jul. 22, 2025

(54) VEHICLE LOWERING AND LIFTING SYSTEM

(71) Applicant: GM GLOBAL TECHNOLOGY OPERATIONS LLC, Detroit, MI (US)

(72) Inventors: George Floarea, Waterloo (CA); David Akl, Kitchener (CA); Eric B. Hoyer, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 251 days.

(21) Appl. No.: 18/124,819

(22) Filed: Mar. 22, 2023

(65) Prior Publication Data

US 2024/0317006 A1   Sep. 26, 2024

(51) Int. Cl.
*B60G 17/015*   (2006.01)
*B60G 15/02*    (2006.01)
*B60G 17/005*   (2006.01)
*B60G 17/017*   (2006.01)

(52) U.S. Cl.
CPC ......... *B60G 17/0157* (2013.01); *B60G 15/02* (2013.01); *B60G 17/005* (2013.01); *B60G 17/017* (2013.01); B60G 2200/326 (2013.01); B60G 2200/44 (2013.01); B60G 2202/42 (2013.01); B60G 2202/442 (2013.01); B60G 2204/1242 (2013.01); B60G 2204/4604 (2013.01); B60G 2500/30 (2013.01); B60G 2600/202 (2013.01); B60G 2800/202 (2013.01); B60G 2800/914 (2013.01)

(58) Field of Classification Search
CPC .. B60G 15/02; B60G 17/005; B60G 17/0157; B60G 17/017; B60G 2200/326; B60G 2200/44; B60G 2200/42; B60G 2202/42; B60G 2202/442; B60G 2204/1242; B60G 2204/4604; B60G 2500/30; B60G 2600/202; B60G 2800/202; B60G 2800/914; B60G 7/006
See application file for complete search history.

(56) References Cited

U.S. PATENT DOCUMENTS

| | | | |
|---|---|---|---|
| 7,281,716 B2 * | 10/2007 | Fanson | B60G 3/265 |
| | | | 280/124.135 |
| 9,132,711 B2 * | 9/2015 | Chung | B60G 17/0157 |
| 9,688,113 B2 * | 6/2017 | Ruppert | B60G 17/0525 |
| 11,052,714 B2 * | 7/2021 | Lumini | B60G 15/067 |
| 2024/0239146 A1 * | 7/2024 | Han | B60G 15/14 |

FOREIGN PATENT DOCUMENTS

WO    WO-2016173768 A1 * 11/2016

OTHER PUBLICATIONS

Maurer, Thomas. WO 2016/173768, machine translation. (Year: 2016).*

* cited by examiner

*Primary Examiner* — Mark L. Greene (57) ABSTRACT

A system configured to raise and lower a chassis of a vehicle. The system includes a damper with a first end connected to the chassis and a second end that is opposite to the first end. An actuation assembly includes a rotatable arm and a motor configured to rotate the rotatable arm, the rotatable arm is connected to both the second end of the damper and a control arm of the vehicle. Rotation of the rotatable arm by the motor moves the damper between a raised position to raise the chassis and a lowered position to lower the chassis.

13 Claims, 5 Drawing Sheets

VEHICLE LOWERING AND LIFTING SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system for lowering and raising a chassis of a vehicle.

Some vehicles include adjustable suspension systems for lowering and raising the vehicle, such as to help a passenger enter and exit the vehicle. Adjustable suspension systems are typically found on relatively high vehicles, such as busses, trucks, SUV's, etc. Vehicles equipped with handicapped accessible systems may also include an adjustable suspension to position a wheelchair ramp at a suitable angle.

SUMMARY

In various features, the present disclosure includes a system configured to raise and lower a chassis of a vehicle. The system includes a damper with a first end connected to the chassis and a second end that is opposite to the first end. An actuation assembly includes a rotatable arm and a motor configured to rotate the rotatable arm, the rotatable arm is connected to both the second end of the damper and a control arm of the vehicle. Rotation of the rotatable arm by the motor moves the damper between a raised position to raise the chassis and a lowered position to lower the chassis.

In further features, the motor is mounted to the control arm.

In further features, the actuation assembly further includes a coupling member mounted to the rotatable arm and extending through a sleeve at the second end of the damper to connect the rotatable arm to the damper, the sleeve rotates about the coupling member as the rotatable arm rotates.

In further features, the actuation assembly further includes a drive shaft extending from the motor to the rotatable arm, the drive shaft is connected to the rotatable arm to rotate the rotatable arm.

In further features, the drive shaft is directly affixed to the rotatable arm.

In further features, the drive shaft extends through the control arm into cooperation with the rotatable arm.

In further features, the drive shaft and the rotatable arm are configured to rotate about a common axis of rotation.

In further features, the actuation assembly further includes: a first drive shaft extending from the motor; a drive sprocket coupled to the first drive shaft such that the drive sprocket rotates with the first drive shaft; a driven sprocket coupled to the drive sprocket by a flexible drive member such that rotation of the drive sprocket rotates the flexible drive member, which rotates the driven sprocket; and a second drive shaft rigidly connected to the driven sprocket and rigidly connected to the rotatable arm such that rotation of the driven sprocket rotates the second drive shaft and the rotatable arm.

In further features, the actuation assembly further includes: a drive shaft extending from the motor, the drive shaft including first threads; a nut including second threads in cooperation with the first threads of the drive shaft; and a guide pin at an exterior of the nut, the guide pin in cooperation with the rotatable arm. Actuation of the drive shaft by the motor in a first direction moves the nut along the drive shaft to rotate the rotatable arm downward and move the damper to the lowered position. Actuation of the drive shaft by the motor in a second direction that is opposite to the first direction moves the nut long the drive shaft to rotate the rotatable arm upward and move the damper to the raised position.

In further features, the damper is a first damper and the actuation assembly is a first actuation assembly at a first wheel of the vehicle. The system further includes a second damper and a second actuation assembly at a second wheel of the vehicle.

In further features, a control module is configured to control actuation of the motor in response to receipt of a first signal and a second signal from a wireless electronic device. In response to receipt of the first signal, the control module is configured to operate the motor to rotate the rotatable arm in a first direction to lower the damper to the lowered position. In response to receipt of the second signal, the control module is configured to operate the motor to rotate the rotatable arm in a second direction that is opposite to the first direction to raise the damper to the raised position.

In further features, a locking pin is movable by a locking solenoid between a locked position and an open position. In the locked position the locking pin is in cooperation with both the control arm and the rotatable arm to lock the rotatable arm relative to the control arm. In the open position the locking pin is disengaged from the rotatable arm.

In further features, a stop tab is affixed to the control arm adjacent to the rotatable arm to stop over-rotation of the rotatable arm.

The present disclosure further includes, in various features, a system configured to raise and lower a chassis of a vehicle. The system includes a damper with a first end connected to the chassis and a second end that is opposite to the first end. An actuation assembly includes a rotatable arm and a motor configured to rotate the rotatable arm. The rotatable arm is connected to both the second end of the damper and a control arm of the vehicle. A control module is configured to control the motor and receive signals from a remote communication device. In response to receipt of a first signal, the control module is configured to operate the motor to rotate the rotatable arm in a first direction to lower the damper and the chassis. In response to receipt of a second signal, the control module is configured to operate the motor to rotate the rotatable arm in a second direction that is opposite to the first direction to raise the damper and raise the chassis.

In further features, the motor is mounted to the control arm, the motor including a drive shaft extending through the control arm into cooperation with the rotatable arm.

In further features, the actuation assembly further includes: a first drive shaft extending from the motor; a drive sprocket coupled to the first drive shaft such that the drive sprocket rotates with the first drive shaft; a driven sprocket coupled to the drive sprocket by a flexible drive member such that rotation of the drive sprocket rotates the flexible drive member, which rotates the driven sprocket; and a second drive shaft rigidly connected to the driven sprocket and rigidly connected to the rotatable arm such that rotation of the driven sprocket rotates the second drive shaft and the rotatable arm.

In further features, the actuation assembly further includes a drive shaft extending from the motor including first threads, a nut including second threads in cooperation with the first threads of the drive shaft, and a guide pin at an exterior of the nut, the guide pin in cooperation with the rotatable arm. Actuation of the drive shaft by the motor in a first direction moves the nut along the drive shaft to rotate the rotatable arm downward and move the damper to a lowered position. Actuation of the drive shaft by the motor in a second direction that is opposite to the first direction moves the nut long the drive shaft to rotate the rotatable arm upward and move the damper to a raised position.

The present disclosure further includes, in various features, a system configured to raise and lower a chassis of a vehicle. A damper includes a first end connected to the chassis and a second end that is opposite to the first end. A rotatable arm is connected to both the second end of the damper and a control arm of the vehicle. A motor includes a drive shaft extending through the control arm, the motor configured to rotate the drive shaft in a first direction and a second direction that is opposite to the first direction. Rotation of the drive shaft in the first direction rotates the rotatable arm to lower the damper and the chassis, and rotation of the drive shaft in a second direction that is opposite to the first direction rotates the rotatable arm to raise the damper and the chassis.

In further features, the motor is directly connected to the control arm.

In further features, the drive shaft of the motor is in cooperation with the rotatable arm.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
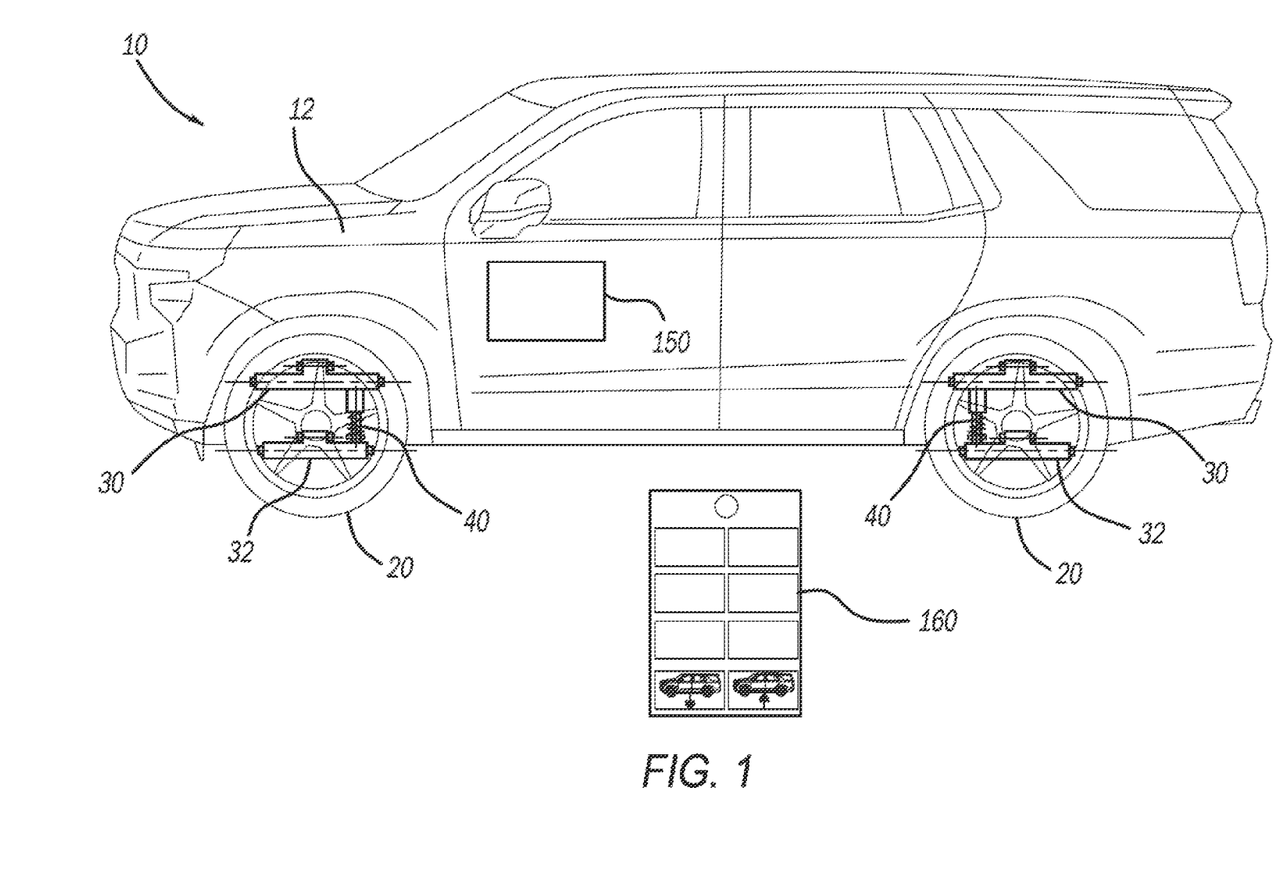
FIG. 1 is a side view of an exemplary vehicle including an adjustable suspension system in accordance with the present disclosure for raising and lowering the vehicle.

FIG. 1 illustrates an exemplary vehicle 10 including an adjustable suspension system in accordance with the present disclosure for raising and lowering the vehicle 10. Although the vehicle 10 is illustrated in FIG. 1 as a sport utility vehicle (SUV), the vehicle 10 may be configured as any other suitable vehicle. For example, the vehicle 10 may be a bus, a van, a fire truck, a construction vehicle, a military vehicle, etc. Furthermore, the vehicle 10 may be configured as a handicap accessible vehicle, such as a van including a ramp that may be deployed to facilitate wheelchair access to the vehicle 10. The suspension system described herein may also be configured for use in any suitable non-vehicular application as well.

Figure 2:
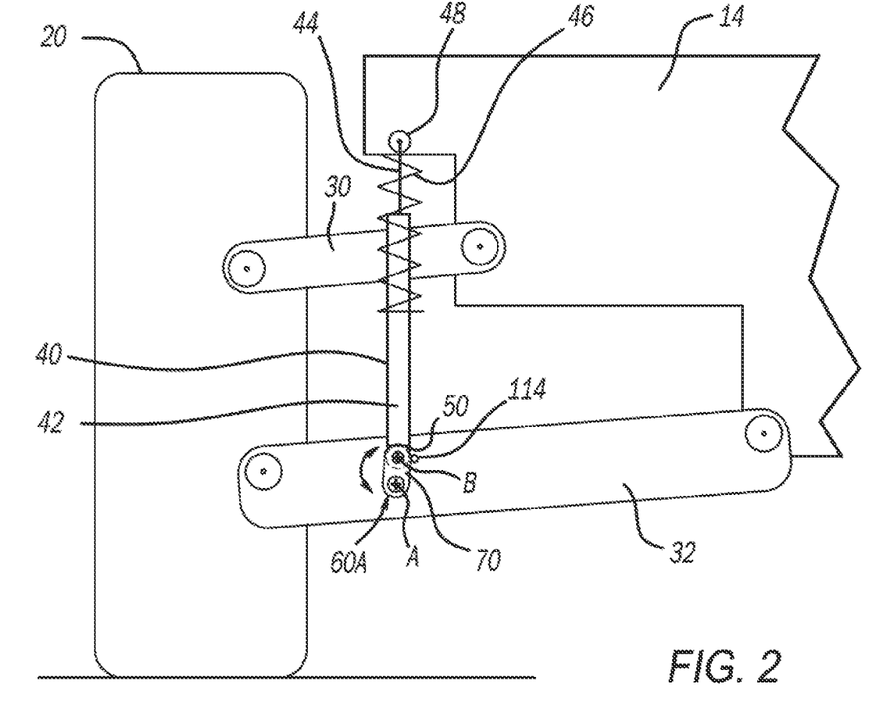
FIG. 2 illustrates a damper of the suspension system of the vehicle of FIG. 1, and an exemplary actuation assembly in accordance with the present disclosure for raising and lowering the damper, which is illustrated in a raised position.

The vehicle 10 includes a body 12 and a chassis 14. A portion of the chassis 14 is illustrated in FIG. 2. The vehicle 10 may be a unibody vehicle, which includes the body 12 and the chassis 14 as a single structure. Alternatively, the vehicle 10 may be configured as a body-on-frame vehicle.

The vehicle 10 includes a plurality of wheels 20, to which the chassis 14 is connected. The vehicle 10 may have any suitable number of wheels, such as four or more wheels. Each one of the wheels 20 is connected to the chassis 14 by way of an upper control arm 30 and a lower control arm 32.

Extending between the chassis 14 and each one of the lower control arms 32 is a damper 40. The damper 40 may be any suitable suspension damper. In the example illustrated, the damper 40 includes a body 42 and a shaft 44 extending therefrom. A spring 46 extends around both the body 42 and the shaft 44. The damper 40 further includes a first end 48 and a second end 50, which is opposite to the first end 48. The first end 48 is connected to the chassis 14. The second end 50 is connected to the lower control arm 32 by way of an actuation assembly 60A.

Figure 3:
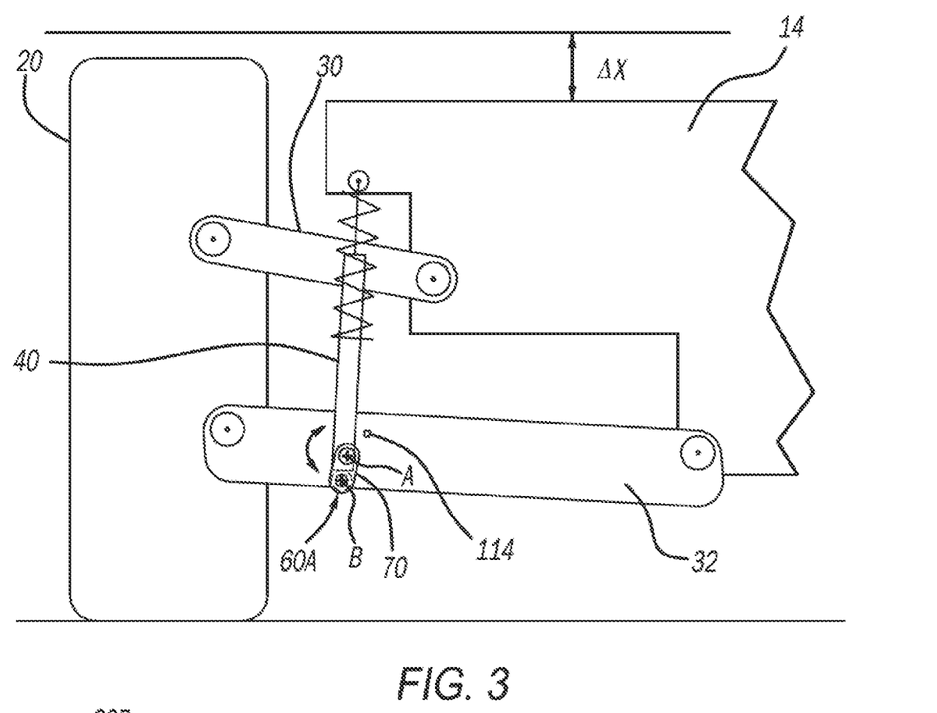
FIG. 3 illustrates the damper and the actuation assembly of FIG. 2 with the damper in a lowered position.

The actuation assembly 60A includes a rotatable arm 70, which is rotatable to move the damper 40 between a raised position and a lowered position. FIG. 2 illustrates the damper 40 in the raised position, and FIG. 3 illustrates the damper 40 in the lowered position. As illustrated in FIG. 3, moving the damper 40 between the raised and lowered positions changes the height of the chassis 14 by a distance X. For the actuation assembly 60A, the distance X depends, in part, on the length of the rotatable arm 70. If the arm 70 is relatively long, the distance X will be greater than when the arm 70 is relatively short. Lowering the chassis 14 by the distance X lowers the height of the vehicle 10 to facilitate passenger ingress and egress. The dampers 40 associated with each of the wheels 20 may be raised and lowered by the same distance. Alternatively, different dampers 40 associated with different wheels 20 may be individually raised and/or lowered by different distances to level the vehicle 10 when the vehicle 10 is on a slope, or tilt the vehicle 10 at any suitable angle in any direction.

Figure 4:
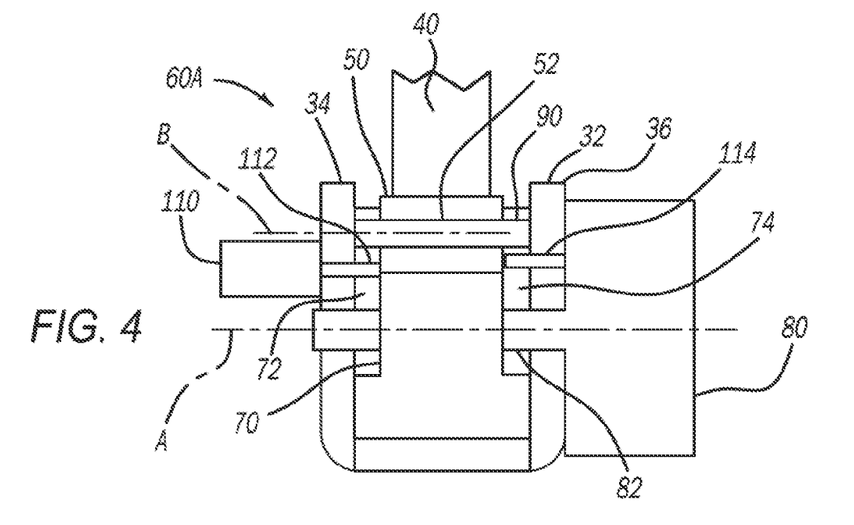
FIG. 4 illustrates the exemplary actuation assembly of FIG. 2 in additional detail.

FIG. 4 illustrates the actuation assembly 60A in additional detail. The actuation assembly 60A further includes a motor 80, which is mounted to the lower control arm 32. More specifically, in the example illustrated the lower control arm 32 includes a first portion 34 and a second portion 36 spaced apart from the first portion 34. The motor 80 is mounted to an exterior of either the first portion 34 or the second portion 36, and the rotatable arm 70 is between the first and second portions 34, 36. The motor 80 includes a drive shaft 82, which extends through the second portion 36 into cooperation with the rotatable arm 70. The drive shaft 82 is connected to the rotatable arm 70 to rotate the rotatable arm 70 about an axis of rotation A.

The second end 50 of the damper 40 includes a sleeve 52. The sleeve 52 is arranged between a first portion 72 and a second portion 74 of the rotatable arm 70. A coupling member 90 extends through the sleeve 52, and is connected to the rotatable arm 70 at opposite ends of the sleeve 52. Actuation of the rotatable arm 70 about the axis of rotation A by the motor 80 results in rotation of the rotatable arm 70 relative to the damper 40 about an axis of rotation B extending through the sleeve 52.

The actuation assembly 60A further includes a locking mechanism configured to lock the damper 40 at any suitable position, such as the raised position of FIG. 2, or at any suitable intermediate position. In the example of FIG. 4, the locking mechanism includes a locking solenoid 110, which is configured to actuate a locking pin 112. To lock the actuation assembly 60A, the locking solenoid 110 is configured to move the locking pin 112 into cooperation with the rotatable arm 70 to prevent the rotatable arm 70 from rotating. To prevent the rotatable arm 70 from over rotating, a stop tab 114 is included proximate to the rotatable arm 70. In the example illustrated, the stop tab 114 extends inward from the second portion 36 of the lower control arm 32 just beyond a vertical position of the rotatable arm 70. More specifically, in the examples of FIGS. 2 and 3, the rotatable arm 70 is rotatable from the lowered position of FIG. 3 to the raised position of FIG. 2 in a clockwise direction. The stop tab 114 is arranged to contact the rotatable arm 70 when the rotatable arm 70 rotates clockwise slightly beyond vertical, thereby preventing over rotation of the rotatable arm 70 in the clockwise direction.

Figure 5:
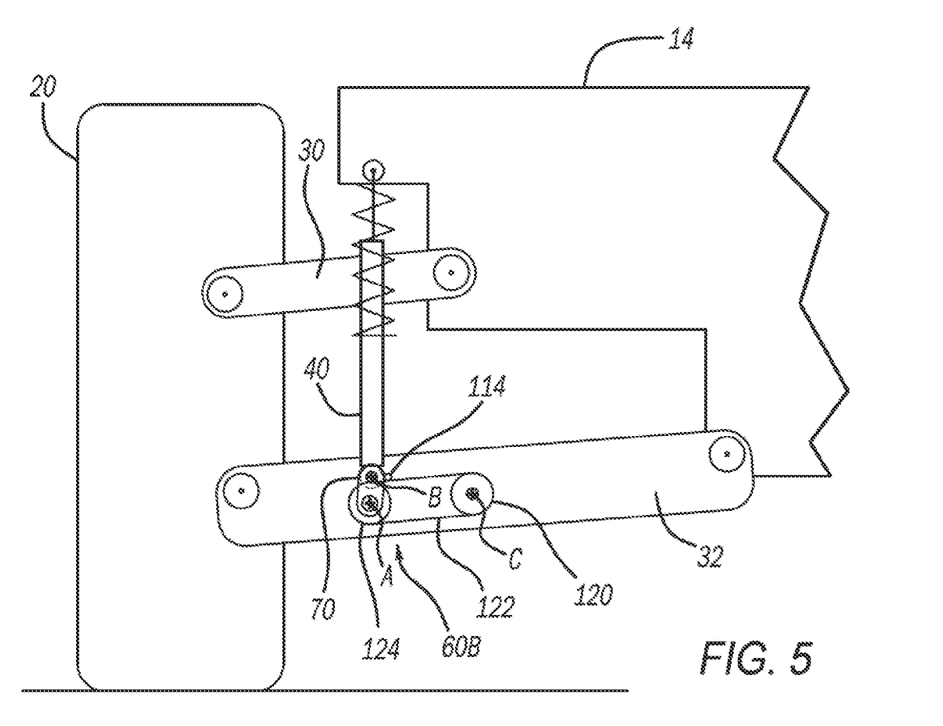
FIG. 5 illustrates the damper of the suspension system of the vehicle of FIG. 1, and another exemplary actuation assembly in accordance with the present disclosure for raising and lowering the damper, which is illustrated in a raised position.
Figure 6:
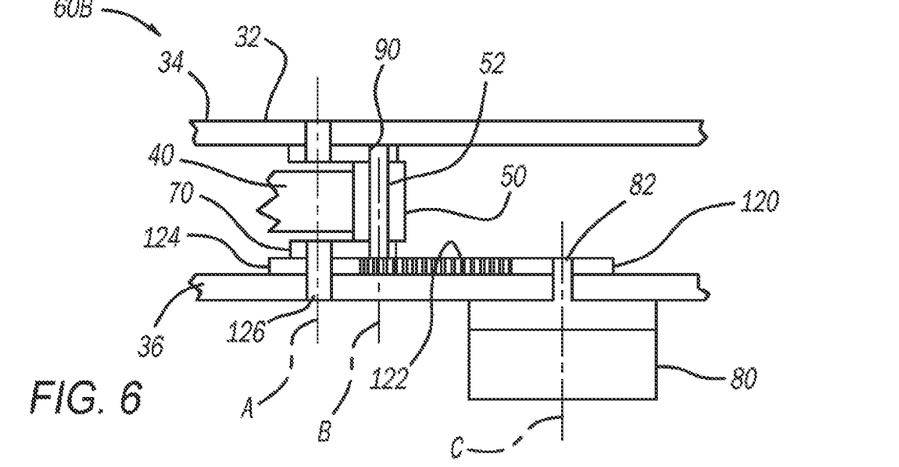
FIG. 6 illustrates the exemplary actuation assembly of FIG. 5 in additional detail.

With reference to FIGS. 5 and 6, an additional actuation assembly 60B in accordance with the present disclosure is illustrated. The actuation assembly 60B includes the motor 80 mounted to the second portion 36 of the lower control arm 32. The first drive shaft 82 extends through the second portion 36 into cooperation with a drive sprocket 120. Rotation of the first drive shaft 82 rotates the drive sprocket 120. The drive sprocket 120 is connected to a flexible drive member 122 such that rotation of the drive sprocket 120 rotates the flexible drive member 122. The flexible drive member 122 may be any suitable belt, chain, etc. configured to connect the drive sprocket 120 to a driven sprocket 124. Rotation of the drive sprocket 120 thus rotates the driven sprocket 124 by way of the flexible drive member 122. A second drive shaft 126 connects the driven sprocket 124 to the rotatable arm 70. Rotation of the driven sprocket 124 thus rotates the rotatable arm 70. The second drive shaft 126 is also in cooperation with the lower control arm 32 to mount the rotatable arm 70 to the lower control arm 32.

Actuation of the motor 80 in a first direction rotates the first drive shaft 82, which results in rotation of the drive sprocket 120, the flexible drive member 122, the driven sprocket 124, and the rotatable arm 70 in a first direction, which may be a counterclockwise direction, to move the damper 40 from the raised position of FIG. 5 to a lowered position to lower the chassis 14 (similar to the lowered position of FIG. 3). Conversely, activation of the motor 80 to rotate the first drive shaft 82 in a clockwise direction results in rotation of the drive sprocket 120, the flexible drive member 122, the driven sprocket 124, and the rotatable arm 70 in a clockwise direction, which raises the damper 40 from the lowered position to the raised position of FIG. 5.

Figure 7:
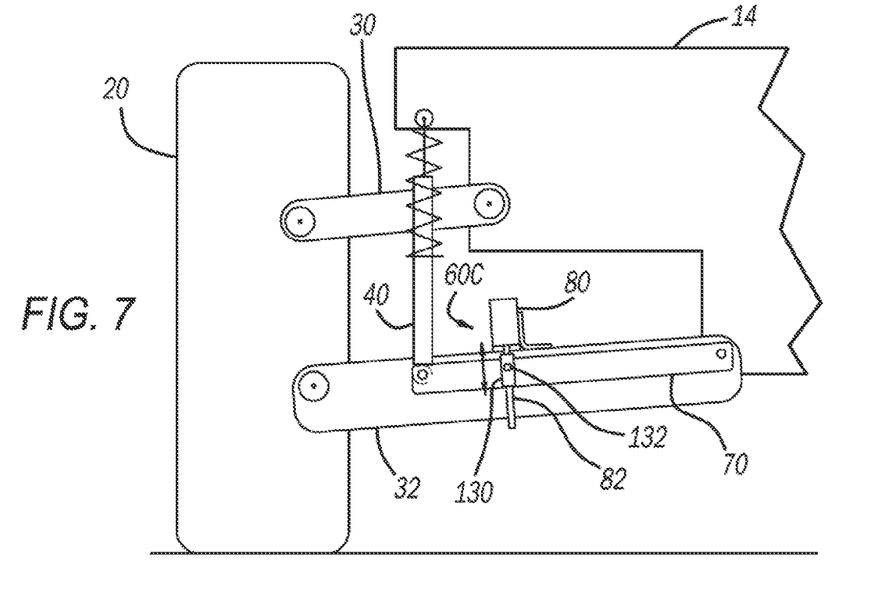
FIG. 7 illustrates the damper of the suspension system of the vehicle of FIG. 1, and an additional exemplary actuation assembly in accordance with the present disclosure for raising and lowering the damper, which is illustrated in a raised position.
Figure 8:
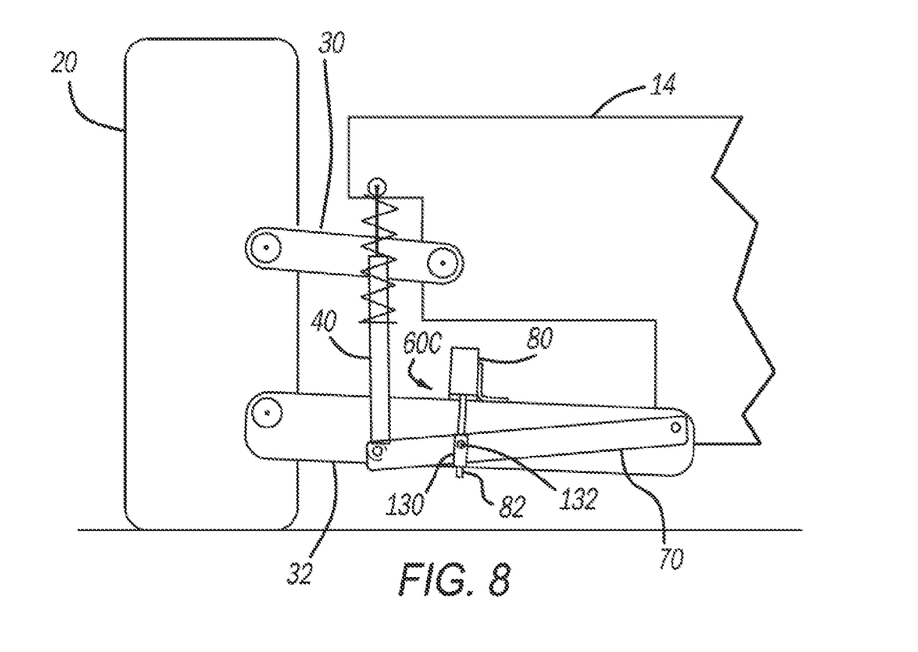
FIG. 8 illustrates the actuation assembly of FIG. 7 with the actuation assembly and the damper in a lowered position.
Figure 9:
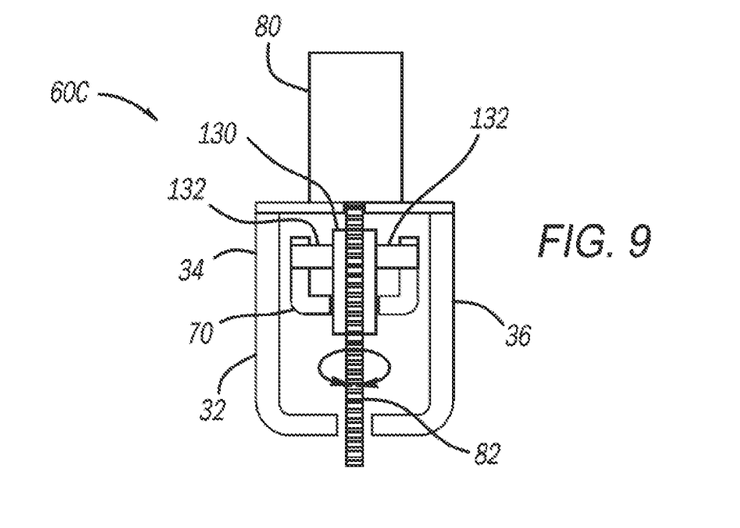
FIG. 9 illustrates the exemplary actuation assembly of FIG. 7 in greater detail.

FIGS. 7-9 illustrate another actuation assembly 60C in accordance with the present disclosure. The actuation assembly 60C includes the motor 80 and the drive shaft 82. The motor 80 is mounted to the lower control arm 32. The drive shaft 82 includes threads and a nut 130 includes internal threads. The nut 130 is threaded onto the drive shaft 82. The nut 130 includes guide pins 132 at an exterior of the nut 130. The guide pins 132 are in cooperation with the rotatable arm 70.

Rotation of the drive shaft 82 by the motor 80 in a first direction moves the nut 130 along the drive shaft 82 away from the motor 80 in a downward direction. The lower control arm 32 is connected to the nut 130 by way of the guide pins 132, and thus as the nut 130 moves lower, the rotatable arm 70 rotates downward from the raised position of FIG. 7 to the lowered position of FIG. 8. This movement lowers the damper 40 and the chassis 14 to their lowered positions. Rotation of the drive shaft 82 in an opposite direction by the motor 80 moves the nut 130 upward towards the motor 80. Movement of the nut 130 upward rotates the lower control arm 32 upward and moves the damper 40 and the chassis 14 from the lowered position of FIG. 8 to the raised position of FIG. 7.

With renewed reference to FIG. 1, a control module 150 is configured to operate the motor 80 to actuate the rotatable arm 70 as described above, and move both the damper 40 and the chassis 14 from the raised positions to the lowered positions, and vice versa. The control module 150 is in communication with each one of the motors 80 associated with each one of the dampers 40. The control module 150 is configured to simultaneously actuate each one of the motors 80 in order to move the chassis 14 up and down, and keep the chassis 14 level. The control module 150 is also configured to individually control actuation of each one of the motors 80 so as to individually control the vertical position of each one of the dampers 40 to tilt the vehicle 10 at any suitable angle in any suitable direction. The control module 150 is in communication with a receiver configured to receive signals from any suitable electronic device, such as a key fob 160. The key fob 160 may include buttons for raising and lowering the vehicle 10. A user may thus use the key fob 160 to lower the vehicle 10 prior to entering the vehicle 10. In addition to, or as an alternative to, lowering the vehicle 10, the control module 150 is configured to actuate the motors 80 to level the vehicle 10, which may facilitate entering and exiting the vehicle 10 when parked on a slope.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system configured to raise and lower a chassis of a vehicle, the system comprising:
   a damper including a first end connected to the chassis and a second end that is opposite to the first end; and
   an actuation assembly including a rotatable arm and a motor configured to rotate the rotatable arm, the rotatable arm is connected to both the second end of the damper and a control arm of the vehicle;
   wherein:
   rotation of the rotatable arm by the motor moves the damper between a raised position to raise the chassis and a lowered position to lower the chassis;

the actuation assembly further includes a drive shaft extending from the motor to the rotatable arm, the drive shaft is connected to the rotatable arm to rotate the rotatable arm; and the drive shaft is directly affixed to the rotatable arm.

2. The system of claim 1, wherein the motor is mounted to the control arm.

3. The system of claim 1, wherein the actuation assembly further includes a coupling member mounted to the rotatable arm and extending through a sleeve at the second end of the damper to connect the rotatable arm to the damper, the sleeve rotates about the coupling member as the rotatable arm rotates.

4. The system of claim 1, wherein the drive shaft extends through the control arm into cooperation with the rotatable arm.

5. The system of claim 1, wherein the drive shaft and the rotatable arm are configured to rotate about a common axis of rotation.

6. The system of claim 1, wherein:
the damper is a first damper and the actuation assembly is a first actuation assembly at a first wheel of the vehicle; and
the system further includes a second damper and a second actuation assembly at a second wheel of the vehicle.

7. The system of claim 6, further comprising a control module configured to control actuation of the motor in response to receipt of a first signal and a second signal from a wireless electronic device;
wherein in response to receipt of the first signal, the control module is configured to operate the motor to rotate the rotatable arm in a first direction to lower the damper to the lowered position; and
wherein in response to receipt of the second signal, the control module is configured to operate the motor to rotate the rotatable arm in a second direction that is opposite to the first direction to raise the damper to the raised position.

8. The system of claim 1, further comprising a locking pin movable by a locking solenoid between a locked position and an open position, in the locked position the locking pin is in cooperation with both the control arm and the rotatable arm to lock the rotatable arm relative to the control arm, in the open position the locking pin is disengaged from the rotatable arm.

9. The system of claim 1, further comprising a stop tab affixed to the control arm adjacent to the rotatable arm to stop over-rotation of the rotatable arm.

10. A system configured to raise and lower a chassis of a vehicle, the system comprising:

a damper including a first end connected to the chassis and a second end that is opposite to the first end;

an actuation assembly including a rotatable arm and a motor configured to rotate the rotatable arm, the rotatable arm is connected to both the second end of the damper and a control arm of the vehicle; and a control module configured to control the motor and receive signals from a remote communication device, in response to receipt of a first signal the control module is configured to operate the motor to rotate the rotatable arm in a first direction to lower the damper and the chassis, and in response to receipt of a second signal the control module is configured to operate the motor to rotate the rotatable arm in a second direction that is opposite to the first direction to raise the damper and raise the chassis;

wherein the actuation assembly further includes:
a first drive shaft extending from the motor;
a drive sprocket coupled to the first drive shaft such that the drive sprocket rotates with the first drive shaft;
a driven sprocket coupled to the drive sprocket by a flexible drive member such that rotation of the drive sprocket rotates the flexible drive member, which rotates the driven sprocket; and
a second drive shaft rigidly connected to the driven sprocket and rigidly connected to the rotatable arm such that rotation of the driven sprocket rotates the second drive shaft and the rotatable arm.

11. A system configured to raise and lower a chassis of a vehicle, the system comprising:

a damper including a first end connected to the chassis and a second end that is opposite to the first end;

a rotatable arm connected to both the second end of the damper and a control arm of the vehicle; and a motor including a drive shaft extending through the control arm, the motor configured to rotate the drive shaft in a first direction and a second direction that is opposite to the first direction, wherein rotation of the drive shaft in the first direction rotates the rotatable arm to lower the damper and the chassis, and rotation of the drive shaft in a second direction that is opposite to the first direction rotates the rotatable arm to raise the damper and the chassis.

12. The system of claim 11, wherein the motor is directly connected to the control arm.

13. The system of claim 11, wherein the drive shaft of the motor is in cooperation with the rotatable arm.

* * * * *